E. W. COX.
BALL BEARING FOR DRAWERS.
APPLICATION FILED FEB. 23, 1915. RENEWED OCT. 18, 1916.

1,227,889.

Patented May 29, 1917.

Inventor
Earl W. Cox

By C. A. Hoskins
Attorney

UNITED STATES PATENT OFFICE.

EARL W. COX, OF SEATTLE, WASHINGTON.

BALL-BEARING FOR DRAWERS.

1,227,889.  Specification of Letters Patent.  Patented May 29, 1917.

Application filed February 23, 1915, Serial No. 9,785. Renewed October 18, 1916. Serial No. 126,445.

*To all whom it may concern:*

Be it known that I, EARL W. Cox, citizen of the United States, residing at Seattle, in the county of King and State of Washington, have invented a certain new and useful Improvement in Ball-Bearings for Drawers, of which the following is a specification.

My invention relates to bearings for supporting and guiding an object that is to be subjected to sliding movements in a fixed path, as for instance the drawer of a bureau or office desk, and the object of my improvement is to provide ball-bearings which may be readily associated with the drawers of a bureau or other article of furniture to support and to guide such drawers in their inwardly and outwardly sliding movements and which shall operate to permit such movements against little frictional resistance; and a further object of my invention is to provide a ball-bearing comprising a metal socket within which a ball of hard material, as of hardened steel, is rotatably disposed to project a portion of its surface therefrom, which metal socket is provided with integral prongs with which to fasten the structure in a desired position.

Figure 1:
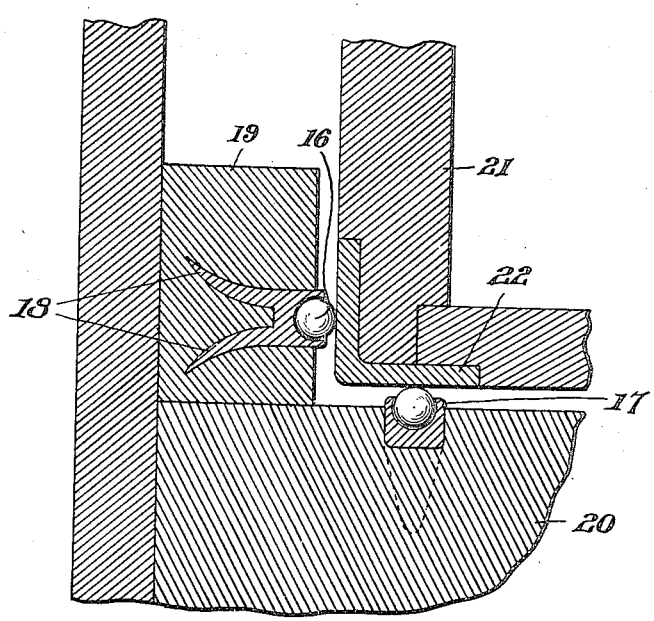
Figure 2:
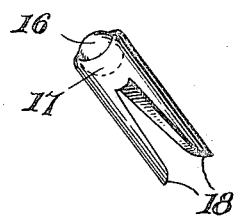

I accomplish these objects by devices illustrated in the accompanying drawings in which Figure 1 is an enlarged fragmentary view in vertical section of parts of a structure embodying a form of my invention and Fig. 2 is a view in perspective of a ball-bearing of such form as it appears before being forced into its position shown in Fig. 1.

Referring to the drawing, throughout which like reference numerals indicate like parts, I have illustrated a preferred form of construction of a ball-bearing including a hard metal ball 16 rotatably disposed in a socket 17, preferably made of brass rod, which socket 17 is provided with integral pointed prongs 18, which prongs 18 are adapted to be forced into a desired wooden support, as for instance, a cross-brace 19 or a front rail 20, as shown in Fig. 1, and when the prongs 18 of a socket 17 are forced into a piece of wood, by reason of their form, such prongs 18 bend to spread apart to assume the position indicated in Fig. 1, thus to prevent the structure from being easily withdrawn from the wood.

In the operation of disposing the socket 17 in its position in the cross-brace 19, such cross-brace 19 is counter-bored to permit its cylindrical portion to enter the wood for a desired distance, the size of such counter-bore corresponding in diameter to the diameter of the socket 17.

Manifestly any desired number of the ball-bearings shown in Fig. 2, may be disposed in a cross-brace, as the cross-brace 19 of a bureau, whereby they may guide a drawer in its movements, and the front rail 20 of a bureau may be of a width to extend nearly to the back wall of a bureau and any desired number of such ball-bearings may be inserted in such rail 20 as will adequately support a drawer. The drawer is designated by the numeral 21, and includes corner angle irons 22 which constitute bearings for resting on the balls 16.

Obviously minor changes may be made in the forms, dimensions and arrangement of parts of my invention without departing from the spirit thereof.

What I claim is:

A ball bearing including a body-portion, a substantially hemi-spherical socket formed in one end, the inner wall of the socket being smooth and unobstructed, a ball of slightly less diameter than the socket received in the socket, the end of the body-portion constituting the side walls of the socket being swaged inwardly to retain the ball therein, the opposite end of the body-portion being bifurcated to provide a pair of legs, the opposed faces of the legs being beveled outwardly toward the ends thereof.

In witness whereof I hereunto subscribe my name this sixth day of February, A. D. 1915.

EARL W. COX.

Witnesses:
 O. JOHNSON,
 FRANK WARREN.